United States Patent [19]

Glazman et al.

[11] Patent Number: 5,319,690
[45] Date of Patent: Jun. 7, 1994

[54] INTERNAL FUEL ROD COATING COMPRISING METAL SILICATES

[75] Inventors: Jerry S. Glazman, Winsted, Conn.; Mark K. Davis, Springfield, Mass.

[73] Assignee: Combustion Engineering Inc., Windsor, Conn.

[21] Appl. No.: 906,380

[22] Filed: Jun. 30, 1992

[51] Int. Cl.$^5$ .............................................. G21C 3/00
[52] U.S. Cl. ..................................... 376/419; 106/628
[58] Field of Search ............... 376/417, 419, 261, 327; 427/235, 203; 252/478; 502/304; 106/628

[56] References Cited

U.S. PATENT DOCUMENTS

| | | | |
|---|---|---|---|
| 3,925,151 | 12/1975 | Klepfer | 376/415 |
| 4,062,806 | 12/1977 | Roberts | 502/172 |
| 4,365,003 | 12/1982 | Danforth et al. | 428/552 |
| 4,372,817 | 2/1983 | Armijo et al. | 376/417 |
| 4,560,575 | 12/1985 | Eisenstatt et al. | 427/6 |
| 4,566,989 | 1/1986 | Radford et al. | 252/478 |
| 4,582,676 | 4/1986 | Chubb | 376/417 |
| 4,587,087 | 5/1986 | Radford et al. | 376/419 |
| 4,587,088 | 5/1986 | Radford | 376/419 |
| 4,636,404 | 1/1987 | Raffel et al. | 427/596 |
| 4,683,114 | 7/1987 | Ho et al. | 376/419 |
| 4,762,675 | 8/1988 | Feild, Jr. | 376/417 |
| 4,824,634 | 4/1989 | Fuhrman et al. | 376/419 |
| 5,028,382 | 7/1991 | King, Jr. et al. | 376/261 |

OTHER PUBLICATIONS

Frank J. Rahn, Achilles G. Adamantiades, John E. Kenton, Chaim Braun; "A Guide to Nuclear Power Technology", The Electric Power Research Inst.; 1984; pp. 429–438.

Kirk-Othmer, "Encyclopedia of Chemical Technology", Third Edition, vol. 20; 1982; pp. 854–881.

Primary Examiner—Donald P. Walsh
Assistant Examiner—Anthony R. Chi
Attorney, Agent, or Firm—Ronald P. Kananen; John H. Mulholland

[57] ABSTRACT

A fuel element for a nuclear reactor is described having a zirconium alloy cladding tube, with a thin coating of a metal silicate and particles of enriched boron-containing compound burnable-poison particles, such as $ZrB_2$, deposited from a liquid suspension which includes a polymer binder material and water and/or alcohol as a diluent.

12 Claims, 2 Drawing Sheets

INTERNAL FUEL ROD COATING COMPRISING METAL SILICATES

FIELD OF THE INVENTION

This invention relates to nuclear fuel elements and, in particular, relates to fuel elements with a zirconium alloy cladding tube having an inside layer of a burnable-poison coating in the form of a thin layer of boron-containing compound particles and a metal silicate. The burnable poison particles and metal silicate are deposited from a liquid suspension on the inside of a zirconium alloy cladding tube and cured at elevated temperatures in a nonreactive environment.

BACKGROUND OF THE INVENTION

General background materials on fuel rods, claddings and absorber materials are available. See. e.g., Frank J. Rahn et al., *A Guide to Nuclear Power Technology*, pp. 429-438 (1984).

In light water reactor (LWR) designs, fuel is formed into oxide pellets, which consist of uranium oxide or mixed uranium/plutonium oxide. These pellets are then placed in long tubes called cladding tubes to form fuel rods. The cladding tube forms a barrier against radioactive fission products released in the fuel pellets during irradiation. Proper fuel design requires an economical fuel cycle, while providing the necessary fuel characteristics for safe plant operation. Thus structural materials must be selected that have low neutron cross-section and low cost, while providing adequate mechanical corrosion resistance characteristics. Fuel assembly design should accordingly allow for the operation of the reactor at the design power and for the highest possible burn-up without breaching the cladding and releasing radioactive products to the primary coolant.

Zirconium alloys are used in fuel designs because they combine desirable nuclear, physical and mechanical properties. Because nuclear-grade zirconium is expensive, its alloys are used only in the active zone of the nuclear core where its neutron economy is most advantageous. Zircaloy-2 and Zircaloy-4 are two slightly different alloys which were developed for nuclear applications. Zircaloy-2 typically contains about 1.4 wt. % tin, 0.15 wt. % iron, 0.1 wt. % chromium and 0.06 wt. % nickel, 1,000 ppm oxygen and the balance zirconium. Zircaloy-4 typically contains about 1.4 wt. % tin, 0.21 wt. % iron, 0.11 wt. % chromium, 30 ppm nickel, 1,200 ppm oxygen and the balance zirconium. Zircaloy-2 has a small content of nickel, while in Zircaloy-4 the nickel content is essentially replaced by iron. This small change in composition reduces the hydrogen absorption rate during service in high-temperature water. The physical and mechanical properties of the two alloys re nearly identical. Pressurized water reactor (PWR) fuel rods are typically made with Zircaloy-4 cladding, while boiling water reactor (BWR) fuel rods utilize Zircaloy-2.

Continuous operation of a reactor requires that the core remain critical. However, to compensate for the gradual depletion of fissile material with time, as burn-up accumulates, and to compensate for other phenomena such as the buildup of fission products, excess reactivity must be built into the nuclear core. This excess reactivity must be controlled at any given time to keep the reactor critical for steady-state operation. This task is accomplished by the use of materials that are strong neutron absorbers or "poisons." Control elements constructed from neutron absorbers regulate power generation according to demand, provide quick shutdown, account for short-term and long-term reactivity changes that result from temperature changes, and adjust for fission product accumulation and fissile material depletion.

The foremost characteristic of a control material is its neutron absorption properties. These vary with the energy of the impinging neutrons but one can gather together the detailed absorption features into a "thermal absorption cross-section," which is of interest in LWR's. The dominant absorber used in control rods in LWR's is boron.

In addition to the movable control rods used in all LWR's, present LWR designs utilize burnable poisons. These are solid neutron absorbers which are placed in the reactor. As it is subjected to neutron irradiation, the burnable absorber material is gradually depleted. Thus the depletion of the burnable poison corresponds, roughly, to the depletion of fissile material. Burnable-poisons are used to counterbalance excess reactivity at the beginning of the fuel cycle and to provide a means for power shaping and optimum core burn-up. Burnable poison compounds currently of interest include boron, gadolinium and erbium.

Many LWR fuel designs employ burnable absorber rods to control axial power peaking or moderator temperature coefficient in a number of ways. In some designs, burnable absorber rods are placed in fuel assembly lattice locations, thereby displacing fuel rods. Other designs employ burnable absorber rod inserts and fuel assembly guide thimbles. Still other designs involve the formation of burnable-absorber coatings on the inside diameters of cladding tubes, on fuel pellet surfaces, or involve distribution of the burnable absorber within the fuel pellet.

The use of a burnable-poison which is disposed on the inside surface of the fuel cladding tube has several advantages. For example, such a configuration can be used with uranium dioxide fuel pellets provided inside the cladding so that the fuel rod produces as much (or almost as much) power as a regular fuel rod.

Moreover, the burnable-poison can be applied to the cladding tube prior to the introduction of the uranium dioxide pellets into the tube, allowing the burnable-poison to be applied to the cladding in a cold (non-nuclear) area. This allows the burnable-poison to be applied by the tubing fabricator or by the fuel-rod fabricator and should reduce the costs associated with the manufacture of the cladding tubes containing the burnable poison.

Furthermore, when the burnable poison is applied to the inside of the fuel cladding tubes, it is relatively easy to adjust the axial gradient of the burnable poison. This provides an advantage over associated methods which involve putting burnable poison on the pellet and mixing pellet types.

Finally, the use of cladding tubes having a burnable-poison layer provides for improved quality control. For example, the burnable-poison coating depth can be accurately determined by bombarding the tubing with neutrons and measuring the fraction of the neutrons which are not absorbed by the burnable poison.

Prior art coatings, however, while adhering when first applied, tend to spall off under the stresses of the irradiation environment in the nuclear reactor core.

For further background, see U.S. Pat. Nos. 3,925,151; 4,372,817; 4,560,575; 4,566,989; 4,582,676; 4,587,087; 4,587,088; and 4,636,404.

SUMMARY OF THE INVENTION

It is, therefore, an object of the present invention to provide an improved fuel element with a burnable-poison coating which substantially overcomes prevalent problems of spalling and coating integrity through the use of metal silicates which will enhance adhesion between the coating and the cladding tube.

It is a further object of the present invention to provide a zirconium alloy cladding tube having an inner thin layer of a boron-containing compound and one or more metal silicates. The boron-containing compound is preferably zirconium diboride and the metal silicates are selected from the alkali and alkaline-earth metal silicates.

It is a further object of the invention to apply a suitable thin layer or coating of boron-containing particles and a metal silicate on the inside surface of the cladding tube. Specifically, a liquid suspension is provided which includes a polymer binder material, metal-silicate, boron-containing compound particles and water or alcohol or a mixture of both as a diluent. The solids content of this suspension is adjusted to provide the desired coating characteristics and the desired suspension viscosity for the coating process and is typically about 25% by weight total solids. A fuel rod cladding tube is then filled with the liquid suspension and drained at a controlled rate, leaving a thin film on the inside surface of the cladding tube. The film is dried at room temperature and cured in a vacuum at temperatures up to 427° C. (800° F.). The resulting thin layer contains boron-containing particles and metal silicates, along with a small residue from the decomposition of the binding material. The boron-containing particles are preferably enriched in the boron-10 ($B^{10}$) isotope to an 80% level.

DETAILED DESCRIPTION

The present invention relates to the fabrication of an improved fuel rod having a burnable-poison coating that is resistant to spalling and maintains a high coating integrity.

Burnable-poison materials of current interest include boron, gadolinium and erbium. Although the preferred embodiments of the present invention use boron compounds, it should be understood that other burnable poisons may be appropriate, depending on the specific application.

Figure 1:
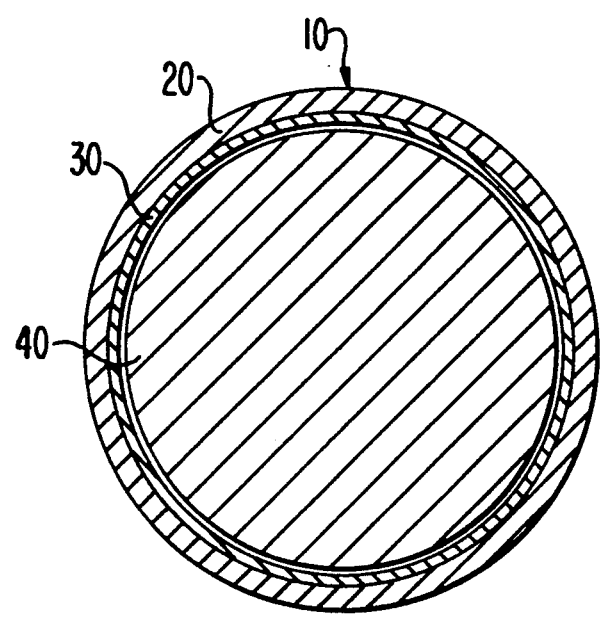
FIG. 1 is a cross-sectional view of a fuel element with a burnable poison coating made according to an embodiment of the invention.

Referring to FIG. 1, the numeral 10 generally indicates a fuel element construction according to an embodiment of the invention for use in a nuclear reactor. The fuel element includes a zirconium alloy cladding tube 20, a coating 30 on the inside of the zirconium alloy cladding tube 20, and pellets 40 of fissionable materials such as uranium dioxide ($UO_2$). The cladding tube 20 is preferably made of Zircaloy-2 or Zircaloy-4. The coating 30 contains boron-containing compounds particles and metal silicates. The deposited particles may have a size range distribution, for example, wherein all particles are of a size below 1.5 microns, 20% of the particles are of a size greater than 1 micron, and 80% of the particles are of a size less than 1 micron. The coating on the inside of the cladding tube also includes residual polymer binding material even though most of the binder material decomposes during the curing operation in a manner to be explained hereinafter.

The assignee of the present invention, Combustion Engineering, Inc., Windsor, Conn. 06095, has previously utilized a product of the Acheson Colloids, a division of Acheson Industries, Inc., Port Huron, Mich. 48060, to supply a graphite lubricating coating on the inside of its zirconium alloy cladding tubes. The produce for coating graphite is designated by Acheson Industries, Inc. as DAG-154 and it is referred to as a fast-drying dry film graphite lubricant. DAG-154 air dries rapidly at room temperature and adheres tenaciously to most substrates with minimum surface preparation. A thin coating can be obtained having high lubricity even when applied by standard spray, brush or dip techniques. DAG-154 provides a stable compound of resin-bonded, processed micron-graphite. Prior to drying, the graphite and resin are suspended in an isopropanol vehicle. The service temperature of DAG-154 to 204° C. (400° F.) with capability of withstanding an intermittent temperature of 454° C. (850° F.) The Thermoplastic polymer resin binder material is present to prevent initial rub-off but slowly decomposes above 93° C. (200° F.) during use. It has been used to lubricate mechanisms, as a thread lubricant and by the present assignee to facilitate the insertion of $UO_2$ pellets in cladding tubes of nuclear fuel elements. DAG-154 normally has a solids content of about 20%.

The present invention involves the use of a DAG-154 analog which is similar to DAG-154, except that a boron-containing compound and a metal silicate replace the graphite pigment. A similar analog, without metal silicates, is disclosed in U.S. Pat. No. 4,824,634 to Fuhrman et al. The boron-containing compound may be zirconium diboride ($ZrB_2$), boron carbide ($B_4C$) or boron nitride (BN), and preferably $ZrB_2$). The preferred metal silicates are the alkali metal (Group 1A) and alkaline-earth metal (Group 2A) silicates such a sodium, lithium, potassium, calcium and so forth, because these silicates can form insoluble glasses when deposited from water, water/alcohol or alcohol solutions and heated to remove the water of hydration. The alkali metal silicates, including sodium, potassium, lithium, and combinations of these metals, are also known as water soluble silicates. Solutions of alkali metal silicates can have a considerable range of mole ratios of silica to metal oxide and are available commercially in a wide range of ratios and concentrations. U.S. Pat. No. 4,062,806 to Roberts indicates that the film-forming ability of alkali metal silicates is better at lower ratios of silica to alkali metal oxide, whereas water resistance improves with an increase in this ratio.

The DAG-154 analog is a liquid suspension which contains a metal silicate and $ZrB_2$ solids dispersed in a isopropanol vehicle with a polymer added to act as a binding agent for the $ZrB_2$ film after curing. Depending the selected silicate, the silicate may be soluble or insoluble. If insoluble, the silicate will be provided in a powder form, will be dispersed like the $ZrB_2$ and will contribute to the overall viscosity of the analog. Even if soluble, the silicate will nonetheless contribute to the overall viscosity. The solution typically contains an organic binder content of about 4% by weight, a $ZrB_2$ solids content of about 8–21% by weight, and a metal silicate content of about 0.3–10% by weight, but these proportions may be adjusted to obtain the desired viscosity and to provide the desired coating properties. Since the binder is essentially eliminated upon curing, the resulting coating will comprise about 2–50% by weight metal silicate and about 50–98% $ZrB_2$. As little as 2–20% by weight metal silicate should improve adhesion of the coating during fuel pellet loading.

Naturally occurring boron includes roughly 20% boron-10 ($B^{10}$) and 80% boron-11 ($B^{11}$). Boron-10, however, has a thermal absorption cross-section that is orders of magnitude greater than boron-11. Thus, the use of isotopically purified boron-10 will minimize the thickness of the burnable-poison coating. The boron-containing compound is therefore preferably enriched to at least an 80% level of boron-10. Methods are available for isotopic separation. For example, Eagle-Picher Industries, Inc., Quapaw, Okla. 74363, enriches the boron by fractional distillation. Boron trifluoride $BF_3$ dimethylether complex is dissociated in a fractional distillation column. Since $B^{11}F_3$ reassocites more readily than $B^{10}F_3$, boron-11 concentrates in the vapor phase and boron-10 concentrates in the liquid phase. Varying degrees of enrichment of boron-10 can be produced by the Eagle-Picher process. Another method for enriching the boron of the boron-containing compound is by atomic vapor laser isotope separation (AVLIS). AVLIS was developed for large scale uranium enrichment applications at the Lawrence Livermore National Laboratory. AVLIS works by first heating and vaporizing a sample of interest followed by laser irradiation at a wavelength specifically selected to ionize only the selected isotope. Once ionized, the isotope is isolated using electric fields. Other methods of isotopic separation include gas diffusion, centrifugal separation, and liquid chromatography.

In performing the present invention, particles containing boron compounds enriched to at least an 80% level of $B^{10}$ are ground to sub-micron size. Specifically, a particle size distribution is provided wherein all particle sizes range below 1.5 microns, 20% of the particles are of a size greater than 1 micron, and 80% of the particles are of a size less than 1 micron, with the smaller size of this range being preferred. In the event that insoluble metal silicates are used, a comparable particle size distribution should be used.

The analog can be applied to the zirconium alloy cladding tube in a number of ways, including spraying and fill-and drain techniques.

Figure 2:
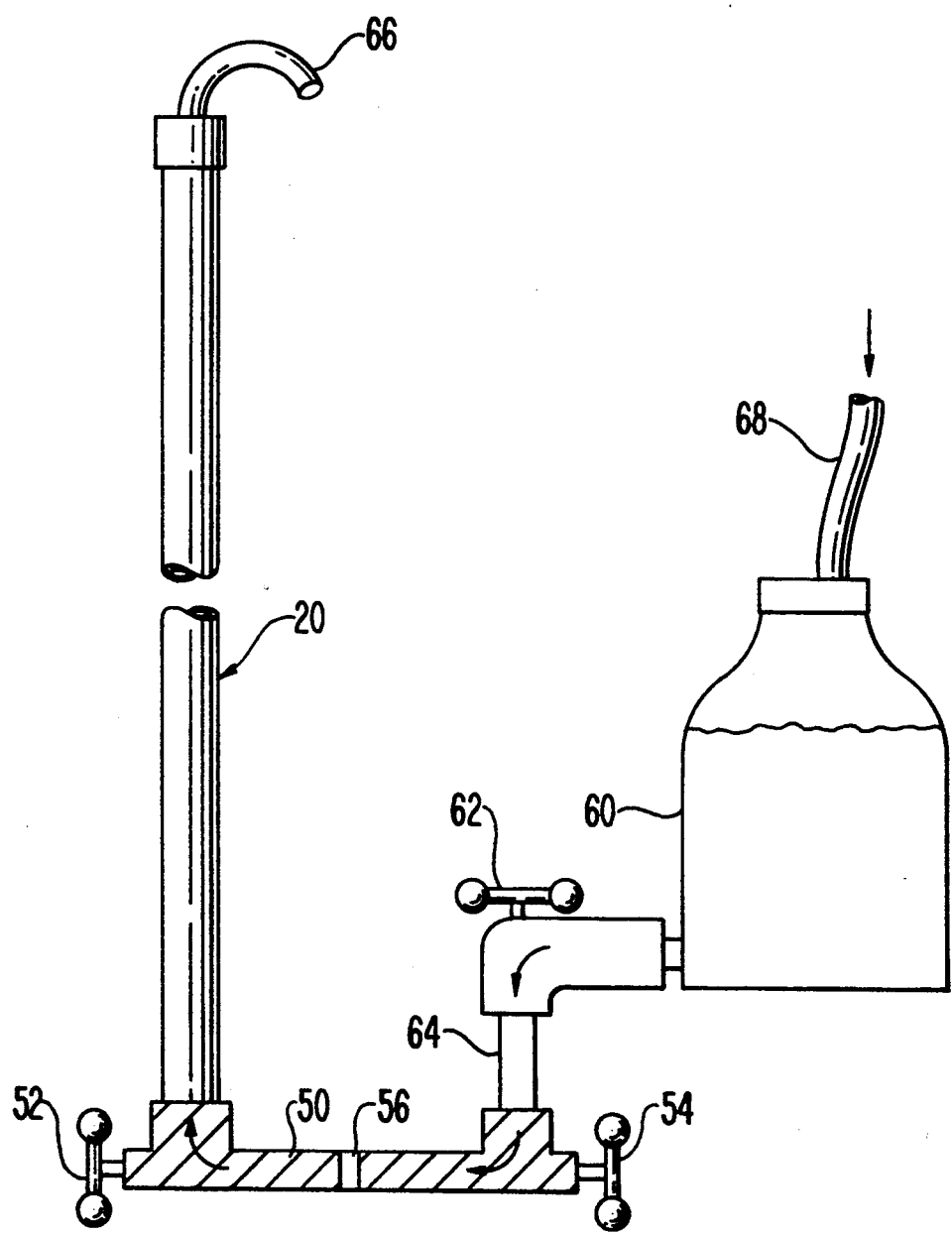
FIG. 2 is a schematic view of the apparatus used for providing the burnable poison coating on the inside of the cladding tube of the fuel element according to an embodiment of the invention.

The preferred coating process is illustrated in FIG. 2 and includes a process by which the liquid suspension is pumped upwardly into the cladding tube 20 while the tube is held in a vertical position. FIG. 2 shows that the cladding tube 20 is attached at its lower end by means of a hose and valve connector apparatus 50 having a valve 52 at the lower end of the cladding tube 20 and a valve 54 adjacent an inlet port from a source of the liquid suspension. The connector 50 has a drain 56 with a drain valve (not shown) between the two valves 52 and 54. A source of the liquid suspension, schematically illustrated as a container of liquid 60, has a valve 62 connected by a conduit 64 to the connector 50 through its valve 54. A tube 68 provides a source of high pressure argon or other suitable gas to pressurize the container 60 of the liquid suspension. The over-pressure of argon gas is used to pump the liquid up into the cladding tube 20 when the valves 62, 54 and 52 are open. Air is exhausted from the tube 10 through an upper vent tube 66. The liquid suspension is held in the cladding tube 20 by means of valve 52 for approximately 1 minute. The liquid is then drained at a controlled rate of approximately 20 feet per minute by manually controlling the valve 52. A more rapid drain rate will provide a thinner $ZrB_2$ coating, whereas a slower drain rate will produce coatings that are thicker and more irregular. During and after the draining process, the coating is allowed to dry by natural convection for at least 30 minutes to prevent axial slumping after which warm air (93° C. maximum) is blown down the tube through the vent 66 to accelerate the evaporation of the isopropanol of the coating. The flow of warm air is maintained for at least 30 minutes after draining.

According to an embodiment of the invention, the coated cladding tube 20 is degassed at room temperature under a vacuum of $10^{-4}$ to $10^{-6}$ torr for two hours minimum. The coating 30 is then cured by heating the coated cladding tube 20 to a maximum of 432° C. (810° F.) at a heating rate of 12° C. (10° F.) per minute while maintaining a vacuum better than $10^{-3}$ torr. The coated cladding tube 20 is then held at a temperature of 421° C. (790° F.) for 24 hours while maintaining a vacuum of $10^{-4}$ to $10^{-6}$ torr, followed by cooling to about 49° to 66° C. under a $10^{-4}$ to $10^{-6}$ torr vacuum. Other curing schemes are readily apparent. For example, according to U.S. Pat. No. 4,365,003 to Danforth et al., curing of inorganic silicates typically takes place at temperatures on the order of 300° F. to about 500° F. and in general, on the order of 150° F. to 1,000° F. Thus, any temperature within these ranges may be selected based on the properties of the resulting coating 30, but the temperature should not exceed 800° F. to avoid degradation of the zirconium alloy properties. Moreover, while curing under vacuum conditions is preferred, such a process could also be conducted under an inert atmosphere such as argon or helium.

Care should be taken not to drive off the residual isopropanol too rapidly since this produces microscopic holes and craters in the coatings. For this reason, the coating is initially outgassed at room temperature and then heated slowly to the final cure temperature. The cure process completely drives off the isopropanol and causes most of the polymeric binder material to decompose.

The addition of metal silicates to the alcohol suspension of polymeric binder and $ZrB_2$ will improve the subsequent adhesion of the $ZrB_2$ following curing of the coating. If desired, binders may be formulated entirely from the metal silicates, thus eliminating the organic binder and thereby reducing the inventory of hydrogen within the fuel rod. The choice of the silicate will be determined, in part, by the metal ion which is preferred within the fuel rod. The optimum coating can be produced from a mixture of more than one metal silicate. In the event that mixed metal silicates are utilized, it may be possible to make each fuel batch with a different ratio of the added metal silicates. In the event of leaking fuel, the identity and composition of the metal ions in the reactor coolant could be used to identify the specific batch in which the leaking tube is located. If such an identification is desired, then trace amounts of metal silicates may be added to the fuel rods solely for identification purposes.

Thus, it will be seen that the invention provides a zirconium alloy cladding tube for nuclear fuel element having a burnable-poison coating on the inside surface. The coating comprises one or more metal silicates and boron-containing compound particles, and is provided in a manner which provides an enhanced adhesion to the cladding tube. The use of these improved burnable absorber coatings eliminates the requirement of displacing fuel rods within the assembly lattice and therefore minimizes the fuel material that is displaced in the nuclear reactor core.

We claim:

1. A method for construction of a burnable-absorber-coated fuel rod cladding tube for a nuclear fuel element comprising the steps of:
   providing a zirconium alloy cladding tube;
   providing a suspension comprising a burnable-absorber-containing compound, a metal silicate and a diluent;
   applying the suspension to the zirconium alloy cladding tube to form a coating;
   degassing the coating in a nonreactive environment;
   curing the coating at elevated temperatures in a nonreactive environment.

2. The method of claim 1, wherein the suspension further comprises an organic binder.

3. The method of claim 2, wherein the suspension comprises from about 0.3% to about 10% by weight metal silicate, from about 8% to about 21% by weight burnable-absorber-containing compound and the remainder diluent.

4. The method of claim 3, wherein the suspension further comprises about 4% by weight organic binder.

5. The method of claim 1, wherein the diluent comprises one or more species selected from the group consisting of water and alcohols.

6. The method of claim 1, wherein the metal silicate is selected from the group consisting of alkali metal silicates and alkaline-earth metal silicates.

7. The method of claim 1, wherein the burnable-absorber-containing compound is a boron-containing compound selected from the group consisting of $ZrB_2$, $B_4C$ and BN.

8. The method of claim 7, wherein the boron-containing compound is enriched to at least an 80% level of boron-10.

9. The method of claim 1, wherein the nonreactive environment is a vacuum.

10. The method of claim 1, wherein the nonreactive environment is a noble gas atmosphere.

11. The method of claim 1, wherein the step of curing the coating is performed within a temperature range of from about 300° F. to about 800° F.

12. The method of claim 1, wherein the step of curing the coating is performed within a temperature range of 700° F. to 800° F.

* * * * *